United States Patent
Petschik et al.

(10) Patent No.: US 9,903,743 B2
(45) Date of Patent: Feb. 27, 2018

(54) OPTICAL ANGLE DETECTOR HAVING A BEAM-FORMING ELEMENT

(71) Applicant: SCANLAB Aktiengesellschaft, Puchheim (DE)

(72) Inventors: Norbert Petschik, Puchheim (DE); Hans-Joachim Munzer, Puchheim (DE); Norbert Kirr, Puchheim (DE)

(73) Assignee: Scanlab GmbH, Puchheim (DE)

( * ) Notice: Subject to any disclaimer, the term of this patent is extended or adjusted under 35 U.S.C. 154(b) by 133 days.

(21) Appl. No.: 14/787,366

(22) PCT Filed: May 8, 2014

(86) PCT No.: PCT/EP2014/059496
§ 371 (c)(1),
(2) Date: Oct. 27, 2015

(87) PCT Pub. No.: WO2014/180968
PCT Pub. Date: Nov. 13, 2014

(65) Prior Publication Data
US 2016/0084677 A1    Mar. 24, 2016

(30) Foreign Application Priority Data

May 10, 2013 (DE) .................. 10 2013 208 649

(51) Int. Cl.
*G01D 5/34* (2006.01)
*G01D 5/347* (2006.01)
(52) U.S. Cl.
CPC ............. *G01D 5/34* (2013.01); *G01D 5/3473* (2013.01); *G01D 5/34715* (2013.01)
(58) Field of Classification Search
CPC .................. G01D 5/34; G01D 5/342
See application file for complete search history.

(56) References Cited

U.S. PATENT DOCUMENTS 3,875,406 A    4/1975   Holeman
5,569,912 A    10/1996  Turk et al.
(Continued)

FOREIGN PATENT DOCUMENTS

CN    101553712 A    10/2009
DE    102004019332 A1    11/2004
(Continued)

OTHER PUBLICATIONS

English Translation of EP 1 071 929, Cambridge Technology, Inc.; publication date Jan. 31, 2001; 12 pages.
(Continued)

*Primary Examiner* — Thanh Luu
(74) *Attorney, Agent, or Firm* — Seyfarth Shaw LLP (57) ABSTRACT

A position detector for determining the rotation angle of an element which is rotatable around an axis of rotation (A) comprises a light source (3), a detector element (18, 19, 20, 21) arranged around the axis of rotation (A) for detecting light radiation emitted by the light source (3), a beam reshaping element (7, 207) arranged between the light source (3) and the detector element (18, 19, 20, 21) such that light from the light source (3) is directed towards the detector element (18, 19, 20, 21), and a light-blocking element (5) positioned between the beam reshaping element (7, 207) and the detector element (18, 19, 20, 21) such that it can rotate around the axis of rotation (A) together with the rotatable element whereby, depending on the rotation angle, the incidence of light on different partial regions of the detector element (18, 19, 20, 21) is prevented. The beam reshaping element (7, 207) comprises a freeform surface (6, 206) at which the light from the light source (3) is reflected on its way to the detector element (18, 19, 20, 21).

20 Claims, 6 Drawing Sheets

(56) References Cited

U.S. PATENT DOCUMENTS

| | | | |
|---|---|---|---|
| 5,844,673 A | 12/1998 | Ivers | |
| 7,113,269 B2 | 9/2006 | Takahaski et al. | |
| 7,580,192 B1 * | 8/2009 | Chu .......................... | F21V 5/04 |
| | | | 359/641 |
| 7,688,432 B1 | 3/2010 | Benner, Jr. | |
| 2002/0038848 A1 | 4/2002 | Chin et al. | |
| 2004/0206894 A1 | 10/2004 | Oka et al. | |
| 2006/0118707 A1 | 6/2006 | Schaake | |
| 2009/0108188 A1 | 4/2009 | Urabe | |
| 2011/0101209 A1 | 5/2011 | Benner, Jr. | |
| 2012/0006982 A1 | 1/2012 | Satone | |

FOREIGN PATENT DOCUMENTS

| | | |
|---|---|---|
| EP | 1071929 A1 | 1/2001 |
| EP | 1071929 B1 | 1/2001 |
| JP | 61124822 A | 6/1986 |
| JP | S61124822 A | 6/1986 |
| JP | 2008298760 A | 12/2008 |
| WO | 2004063671 A2 | 7/2004 |
| WO | 2008018059 A2 | 2/2008 |
| WO | 2010119513 A1 | 10/2010 |

OTHER PUBLICATIONS

International Preliminary Report on Patentability with Written Opinion, with English translation, dated Nov. 10, 2015; 13 pages.
Chinese Office Action for Application No. 201480035258.3 dated Jun. 2, 2017, 8 pages.

* cited by examiner

OPTICAL ANGLE DETECTOR HAVING A BEAM-FORMING ELEMENT

The invention refers to an optical angular position detector (for short, also merely denoted as "position detector") for determining the angular position of a rotatable element as it is, for example, used in galvanometer drives. Apart from the movement of read heads in hard disc memories and in CD players, galvanometer drives are, in particular, used for rotating mirrors in (laser) scanning devices. Such scanning devices are, for instance, employed in the field of additive manufacturing methods, where a laser beam is directed to selected positions in a layer of a building material in order to selectively solidify the building material. For doing so, a deflection mirror is fixed to a rotatable shaft so that the position of incidence of the deflected laser beam can be manipulated by rotating the mirror. It is obvious that, in order to achieve a high manufacturing accuracy, the rotational position of the mirror needs to be adjusted as accurately as possible and needs to be permanently monitored.

The angular position is typically monitored by means of a position detector that determines the angular position. For a high measurement accuracy of such a detector, a good temperature stability, a high signal-to-noise ratio, and a good reproducibility of the output values are required. With regard to the operating speed, it is required that the rotating moving mass is not substantially increased when the sensor is added. With regard to the handling, a small overall size of such a detector is also advantageous.

While in the past mainly capacitive position detectors have been used, recently the trend is towards optical position detectors as these tend to be manufacturable more cost-efficiently and smaller in size.

Among the optical position detectors there are, firstly, those in which light from a light source passes on its way to a detector arrangement through a disc having opaque stripes, wherein the disc rotates around the axis of rotation of the shaft whose angular position has to be determined. Therein, the angular information is encoded via the stripe code on the disc. On the one hand, the angular position is determined by counting the pulses generated by a light/dark transition induced by the movement of the stripe code (incremental encoder). Alternatively, the absolute angular position may be encoded by the code on the disc (absolute encoder).

In contrast, the present application is directed to those optical position detectors in which the angular position is determined based on the analog output signal of the detector arrangement without the aid of a code (uncoded). The general operating principle of such an optical detector is such that light is allowed to fall on a sensor whereby different regions of the sensor area are covered depending on the angular position of a shaft. Thereby, a correlation is obtained between the signal output by the light sensor region, the signal being proportional to the area onto which the light falls, and the angular position of the rotary shaft.

An example of such a sensor is described in European patent EP 1 071 929 B1. In the position detector according to EP 1 071 929 B1, which is described with reference to FIGS. 5 and 6, a rotary shaft 114 is accommodated in a housing 116 and is rotatably mounted there by means of bearings 118 and 120. A rotating mirror is mounted at one end 125 of shaft 114. At the other end 132 of the shaft, position detector 112 is located. The latter consists of a detector housing 121 accommodating photo sensors 134, 136, 138, and 140, a light-blocking element 130, as well as an LED light source 146. Whereas LED light source 146 and photo sensors 134, 136, 138, and 140 are stationary, light-blocking element 130 is connected to rotary shaft 114.

Figure 6:
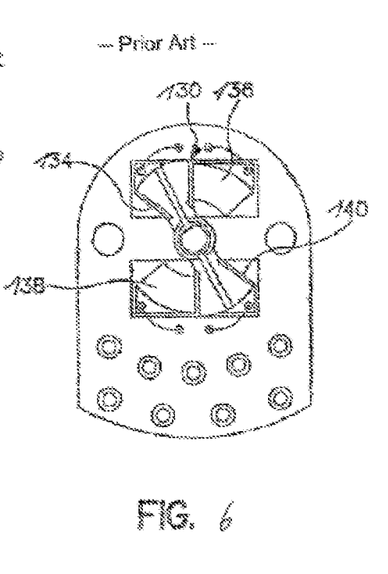

As can be seen particularly in FIG. 6, photo sensors 134, 136, 138, and 140 shaped as circular ring segments are symmetrically arranged around the rotary shaft. Light-blocking element 130 has the shape of a bow tie (commonly called "butterfly") and covers different partial regions of the photo sensors depending on its angular position.

The measurement accuracy of such a position detector is impaired by radial and axial movements of the shaft.

In order to achieve a signal-to-noise ratio that is as high as possible, a wide-angle LED is used in EP 1 071 929 B1 which is positioned as closely to the photo sensors as possible, so that as much light from the light source as possible can be incident on the photo sensors without further intervening optical elements. Such a setup also has a further advantage of being very compact. For an increased insensitivity to radial movements of shaft 114, the signals of two photo sensors arranged opposite one another are summed up in the photo sensor readout and both sum signals thus obtained are fed into the different inputs of a differential amplifier.

A basic requirement for the above-described position detector of the prior art is the availability of a wide-angle LED that emits light as homogeneously as possible in all angular directions. As such a homogeneity is achievable with wide-angle LEDs only to a limited extent, there is a risk that the different photo sensors yield different output signals because they receive different amounts of light, which ultimately leads to a reduced accuracy of the angle measurement, particularly to an insufficient linearity.

Figure 7:
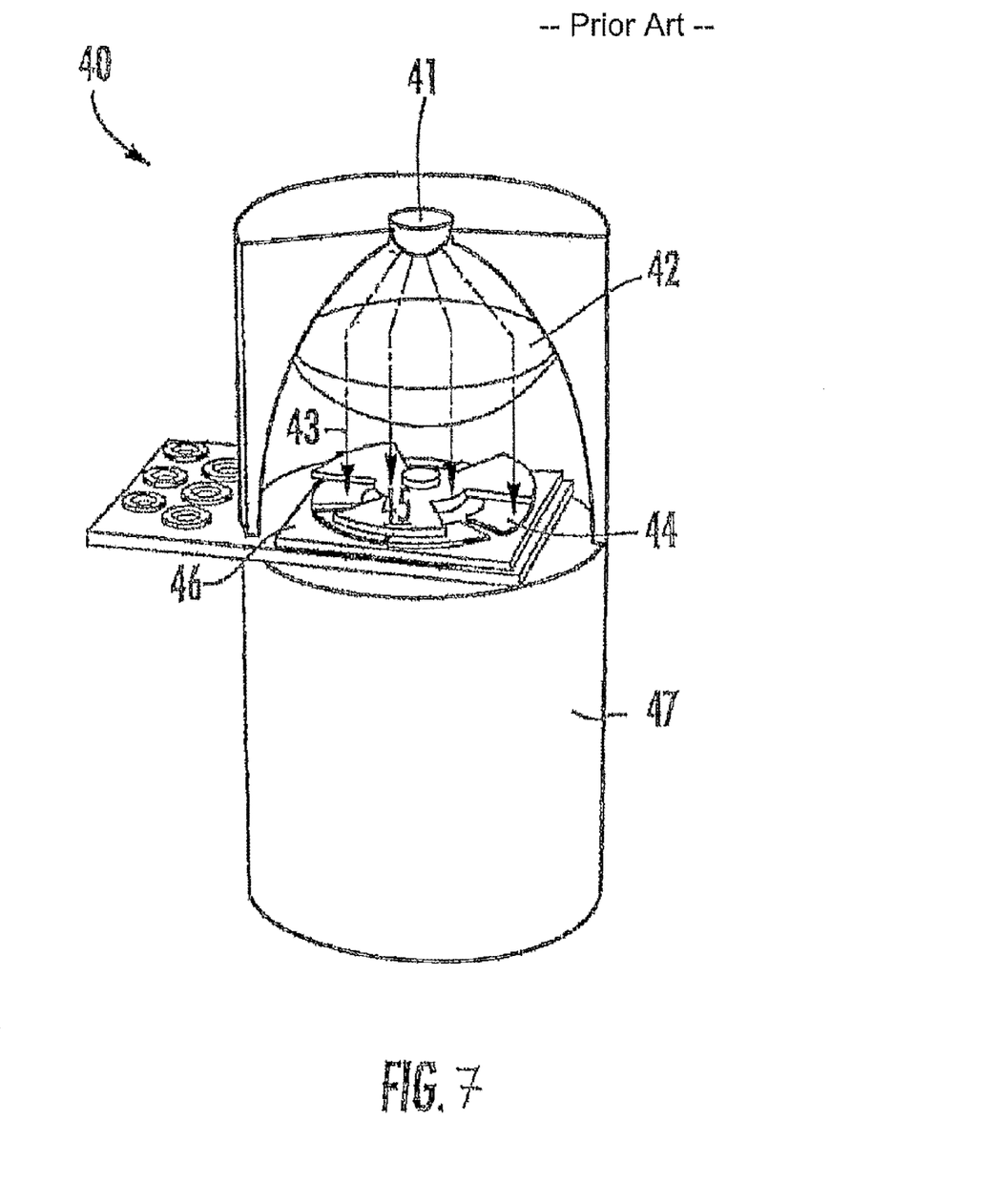
FIG. 7 shows a position detector corresponding to the prior art according to U.S. Pat. No. 7,688,432 B1.

Furthermore, yet another consequence of positioning a wide-angle LED closely to the photo sensors is an increased dependence of the output signals of the position detector on axial movements of the shaft. This is due to a strong divergence of light radiation incident on the photo sensors. This is the reason why, for instance, in U.S. Pat. No. 7,688,432 B1, by means of a lens, a collimation of the light incident on the sensors is provided for. FIG. 7 shows a setup according to U.S. Pat. No. 7,688,432 B1, having an LED 41, a lens 42, light sensors 44, a light-blocking element 45, and a circuit board 46, which constitute an angular position detector 40 arranged atop a motor body 47. By using lens 42, apart from the collimation, it is further provided that light beams emitted by LED 41 at a large angle are not lost, but are rather also utilized, whereby the signal-to-noise ratio increases.

However, a disadvantage of the embodiment just described is that, in order to utilize light beams emitted by LED 41 at a particularly large angle, the diameter of lens 42 needs to be quite large. Furthermore, although parallel light travels from lens 42 to sensors 44, not the entire parallel light is needed since sensors 44 occupy only a fraction of the area of circuit board 46. Hereby, the improvement of the signal-to-noise ratio by using lens 42 is put into perspective.

In view of the problems described above, it is an object of the invention to provide a position detector having a high signal-to-noise ratio.

The object is solved by a position detector according to claim 1. Further developments of the invention are specified in the dependent claims.

Figure 1:
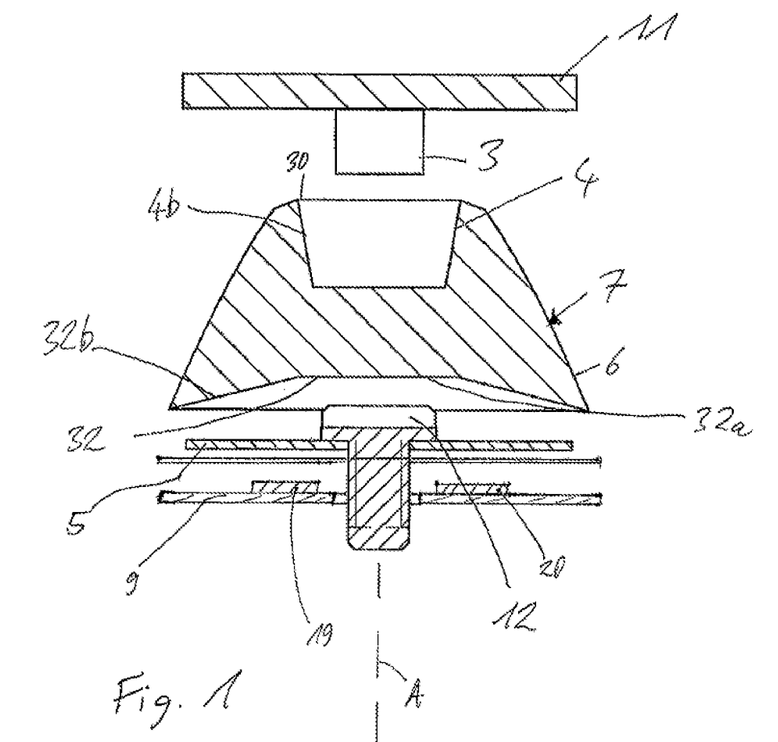
FIG. 1 shows a schematic lateral cross-section through an angular position detector according to the invention.
Figure 2:
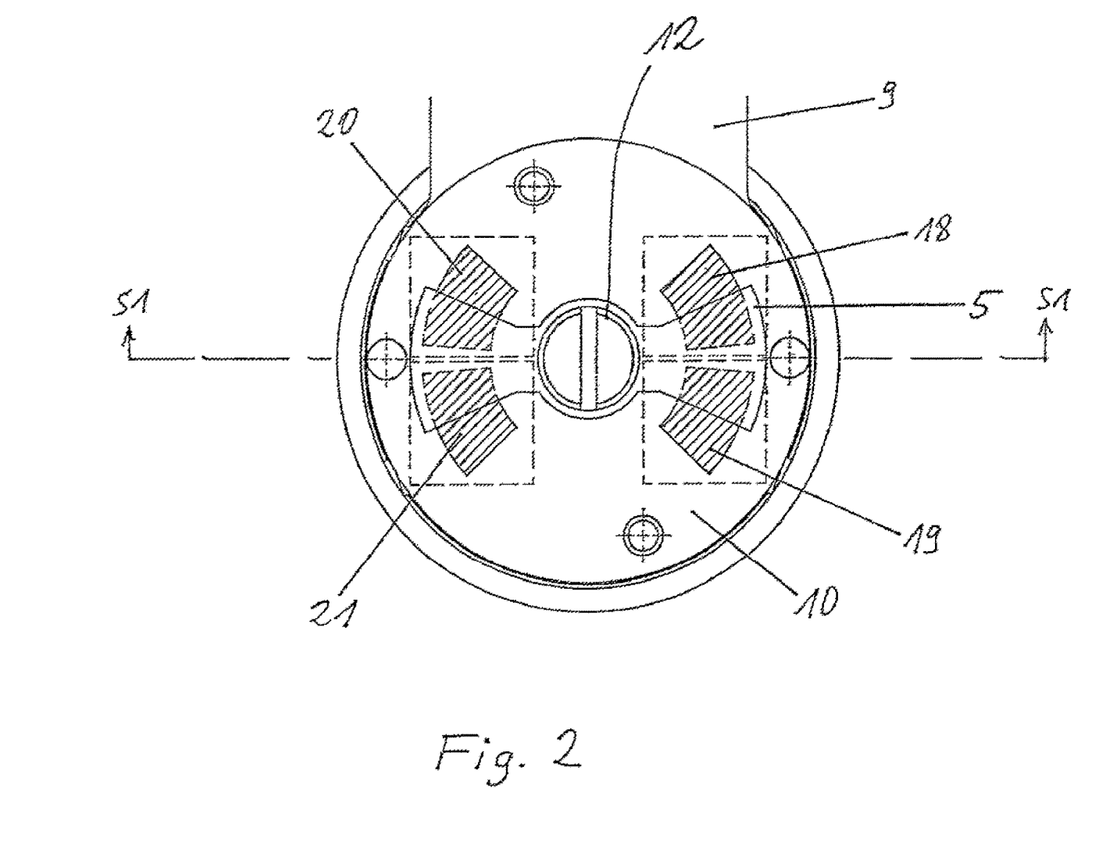
FIG. 2 shows a top view onto that portion of the angular position detector shown in FIG. 1 in which the detector element and the light-blocking element are located.
Figure 3:
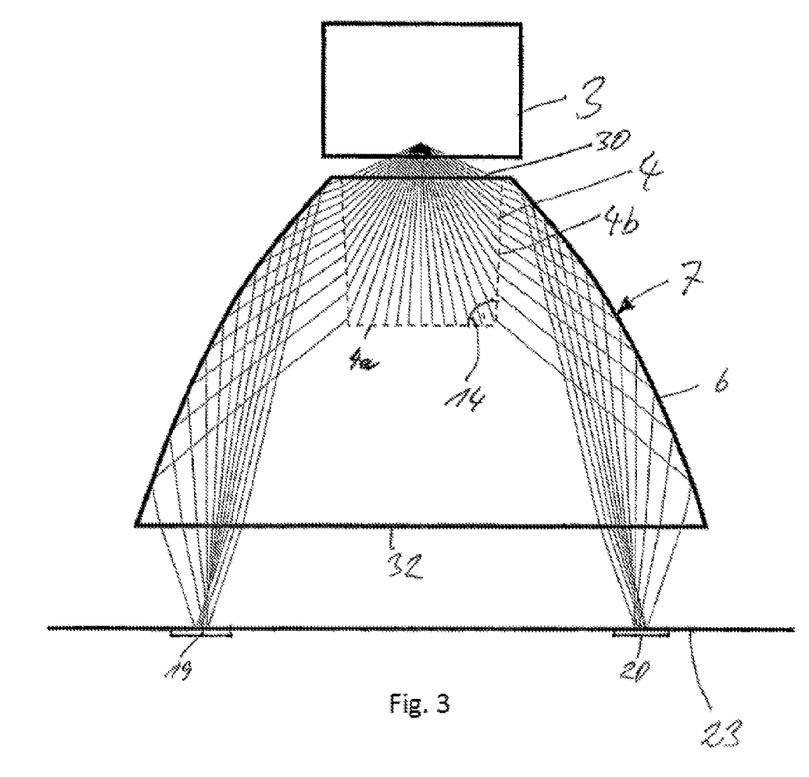
FIG. 3 shows the optical path in an angular position detector according to a first embodiment.
Figure 4:
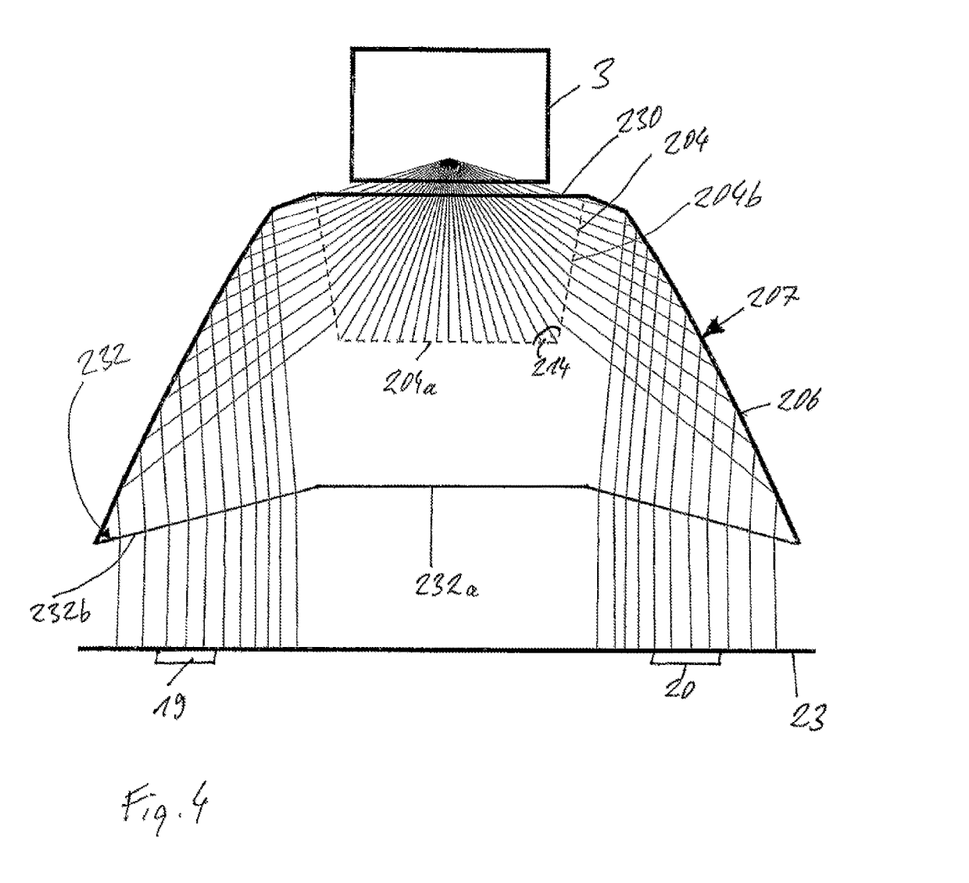
FIG. 4 shows the optical path in an angular position detector according to a second embodiment.

In the following, an embodiment of the present invention is described with reference to FIGS. 1 to 4. Here, FIG. 1 shows a lateral cross-section through the position detector according to the invention, which is merely schematically depicted. FIG. 2 shows a top view onto the detector portion having the photo sensors and the light-blocking element, and FIGS. 3 and 4 show the optical paths of the light emitted by the light source when the setup shown in FIG. 1 is used. In FIG. 2, a cutting line S1-S1 is depicted which shall indicate the position of the cross-sectional plane in FIG. 1.

Figure 5:
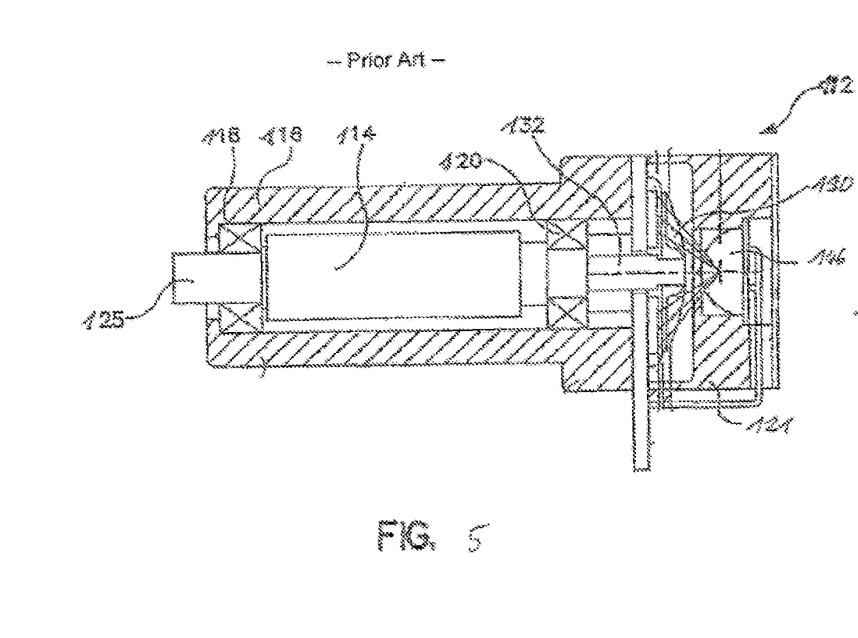
FIGS. 5 and 6 show position detectors corresponding to the prior art according to EP 1 071 929 B1 in a lateral sectional view and in a top view onto the photo sensors used in the position detector.

In the representation in FIGS. 1 and 2, the basic setup is very similar to that illustrated in FIGS. 5 and 6. As already mentioned in the introductory part, the present invention is directed to a position detector in which the angular position is determined based on the analog output signal of the detector arrangement without the aid of a code (uncoded). In particular, again, a circuit board 9, photo sensors 18, 19, 20, and 21, an aperture mask 10, and a light-blocking element 5 are stacked. It is noted that, in FIG. 1, photo sensors 19 and 20 are only shown for a better understanding. Strictly speaking, no photo sensor would be visible along the cutting line shown in FIG. 2. Further, not shown in FIG. 1 is a housing encompassing the overall setup in FIG. 1, which encloses the setup with respect to the environment in a light-tight manner.

In analogy to the setup in FIG. 5, the setup shown in FIG. 1 is connected to a rotary shaft to which, for instance, a galvanometer mirror may be fixed. Here, the rotary shaft is arranged below the setup in FIG. 1 such that its longitudinal axis, which is the axis of rotation A at the same time, passes through a centre of fastening screw 12 in a vertical direction. Here, by means of fastening screw 12, light-blocking element 5 is fixed to the rotary shaft such that it is able to rotate together with the rotary shaft, whereas circuit board 9, photo sensors 18, 19, 20, and 21, and aperture mask 10 are stationary.

As can be seen from FIG. 2, four photo sensors 18, 19, 20, 21 are symmetrically arranged around the longitudinal axis of the shaft as a detector element, and also light-blocking element 5, being, in the same manner as in the prior art, a bow tie-shaped (butterfly) element, is positioned such that its symmetry axis coincides with longitudinal axis A of the shaft. Aperture mask 10 partially covers photo sensors 18, 19, 20, 21 and has an opening shaped as a circular ring segment above each of the photo sensors. An opening shaped as a circular ring segment is advantageous because it results in a uniform shadowing of photo sensors 18, 19, 20, 21 when the element shaped as a bow tie (butterfly) rotates, leading to a very good linearity. In a preferred implementation, the outer edge of light-blocking element 5 has a greater distance to longitudinal axis A of the rotary shaft than the outer edge of a circular ring segment.

It should be emphasized that, in the context of the present invention, light-blocking element 5 may have a shape different from the "butterfly"-shape as well. For a high linearity it is, however, advantageous if light-blocking element 5 has coverage areas symmetrically arranged with respect to its symmetry axis, which coincides with the axis of rotation, the coverage areas being respectively confined in a circumferential direction by straight lines intersecting the symmetry axis, so that straight edges are provided at these points. The shape of light-blocking element 5 has, in particular, an n-fold symmetry (n≥2).

Likewise, the openings in aperture mask 10 may also have a different shape. If, however, there are sensor regions which cannot be covered by light-blocking element 5, a deteriorated signal-to-noise ratio results therefrom. Besides, trade-offs will possibly have to be accepted in terms of the linearity if the shape of the light-blocking element significantly deviates from the bow tie-shape, and is, for instance, rectangular.

It is noted that it is also possible to omit aperture mask 10. In such a case, a deteriorated signal-to-noise ratio has also to be accepted in case that there are sensor regions which cannot be covered by light-blocking element 5. It is, however, possible to freely select the shape of photo sensors 18, 19, 20, 21. In particular, these can be respectively shaped as circular ring segments.

Slit diodes may be used as photo sensors 18, 19, 20, 21. However, it is not mandatory for the invention to use slit diodes. It is also possible to use other types of photo sensors. Likewise, it is not mandatory to use four photo sensors, it rather may be two, three, five, six, seven, eight or more photo sensors also arranged around the axis of rotation in such a manner that the axis of rotation does not pass through any of the photo sensors. Although this is not mandatorily required, the photo sensors are, as a rule, symmetrically arranged around the axis of rotation, i.e. the photo sensor arrangement has an n-fold symmetry (n≥2) in a plane perpendicular to the axis of rotation. Furthermore, in particular, a symmetric arrangement with respect to a mirror plane (containing the axis of rotation) is also possible.

In order to achieve an increased insensitivity to radial movements of rotary shaft 114, which is not shown in FIG. 1, by analogy to the procedure described in EP 1 071 929 B1, the signals of two photo sensors arranged opposite one another are summed up in the photo sensor readout of four photo sensors and both sum signals thus obtained are fed into the different inputs of a differential amplifier. However, the evaluation of the signals of the photo sensors may also be performed in another manner, alternatively to the above-described procedure.

A single light source 3 may be used as a source of illumination in the present case. Here, it may be a commercially available LED or a laser diode. LEDs or also laser diodes that can be used in the present invention may already contain lenses or aperture elements. In the Figures, light source 3 is merely schematically depicted, the optical path is illustrated such as if all rays were emanating from a single point. In FIG. 1, additionally, a holder 11, e.g. a circuit board, is illustrated on which light source 3 is mounted.

The basic idea of the present invention is: the better the utilization of the light emitted by light source 3, the stronger the signal delivered by the detector. In an ideal case, preferably the entire light emitted by light source 3 should fall onto the photo sensors if one ignores blocking-out by light-blocking element 5. Therefore, light emitted by light source 3 is directed into a ring-shaped region on circuit board 9 having photo sensors 18, 19, 20, and 21, where the circular ring segment-shaped photo sensors or, respectively, circular ring segment-shaped openings in aperture mask 10 are located. Since this goal is not achievable by means of a lens as in FIG. 7, the idea of the invention is to use a beam shaping element, also referred to as a beam reshaping element, denoted by reference sign 7 in FIG. 1. In the following, this beam shaping element 7 will also be referred to as a freeform element since the desired beam shaping is achieved due to the fact that beam shaping element 7 has at least one non-planar, non-spherical surface at which light rays from the light source entering beam shaping element 7 are reflected on their way to the photo sensors.

Beam shaping element 7 in FIG. 7 has a truncated cone-like shape wherein the symmetry axis of the truncated cone passes through the centre of fastening screw 12 and coincides with the axis of rotation A when the position detector is fixed to a rotary axis. At a rear side 30 of beam shaping element 7 facing light source 3, a truncated cone-like recess 4 is provided. A side 32 of beam shaping element 7 facing fastening screw 12 has a central region 32a which is substantially parallel to the plane of the photo sensors and a peripheral region 32b. Since central region 32a is deeper recessed with respect to fastening screw 12 than peripheral region 32b, surface 32b corresponds to a side face of a truncated cone.

Side face 6 of beam shaping element 7 has a convex shape. As seen in FIG. 1, side face 6 may, in particular, be curved outwards with respect to the symmetry axis and be a freeform surface. Here, the exact shaping (curvature) of the individual surfaces of beam shaping element 7 can be determined by computer simulations using a commercially available software, e.g. ASAP. By way of example, the freeform surfaces may then be characterized by polynomials, splines, or in a different manner. Since side face 6 may be curved outwards, the shape of beam shaping element 7 has purposely been described above as "truncated cone-like". A truncated cone shape, whose side face in the sectional view of FIG. 1 is not curved outwards, is a special case thereof. Since, in the sectional view of FIG. 1, also lateral surface 4b of recess 4 may have a curvature, the shape of recess 4 has also generally been characterized as "truncated cone-like".

Beam shaping element 7, which may be made of a plastic material (for instance, plexiglass) or e.g. of glass, is characterized in that the light is directed onto the photo sensors not only by refraction, but also by reflection in the beam shaping element.

In beam shaping element 7 exemplary described herein, a reflection takes place at a boundary surface of beam shaping element 7 to the outside, namely at side face 6. Here, ideally, it is a total reflection, where more that 99% of the light is reflected in order to have a light yield as high as possible. However, it is also possible to work without total reflection, e.g. by coating side face 6 with a metal. The mere fact that the light reflected at side face 6 is utilized already leads to an improvement with respect to the case shown in FIG. 7. Hence, even if just more that 10%, more that 50%, more that 70%, 80%, 90%, or even 95% of the light is reflected, the invention brings about an improvement with respect to the prior art. Certainly, the improvement is the biggest when as little light as possible is lost.

Since, according to the invention, beam shaping element 7 is spatially arranged between light source 3 and the detector element having the photo sensors, the position detector according to the invention further has a compact, space-saving setup.

In the following, the setup and function of the beam shaping element is explained with different embodiments.

First Embodiment

FIG. 3 shows the optical path when a beam shaping element 7 according to a first embodiment is used. Here, the arrangement of the light source and of beam shaping element 7 are the same as the arrangement in FIG. 1. In FIG. 3, the setup below beam shaping element 7 is identical to the setup in FIG. 1. However, instead of the setup below beam shaping element 7 shown in FIG. 1, FIG. 3 merely schematically shows a plane 23 which shall represent a plane in which flat sensors 18, 19, 20, 21 are arranged.

Here, the position of photo sensors 19, 20 is merely schematically illustrated.

As one can see in FIG. 3, light source 3 is positioned closely to the side of beam shaping element 7 facing away from the photo sensors such that it does not protrude into recess 4. The rays emanating from light source 3 are first refracted at the edge of recess 4 in beam shaping element 7 and are subsequently directed in the direction of photo sensors 19 and 20 by total reflection at side face 6 of beam shaping element 7, wherein a refraction takes place once again at exit side 32. In the specific configuration according to the first embodiment, exit side surface 32 is not divided into two parts as in FIG. 1, but is rather substantially planar.

It can be seen that in a forward direction (in a certain angular range around the symmetry axis if the direction along the symmetry axis towards the photo sensors is assumed to be 0°) the light rays from light source 3 end at a border of recess 4. This is because the border of recess 4 is coated with an opaque material at this point. Thereby, it is prevented that light falls onto fastening screw 12 and is reflected by the same in an uncontrolled manner. Specifically, in FIG. 3 the surface of truncated cone-shaped recess 4 facing the photo sensors, i.e. bottom 4a of recess 4, is opaque.

The opacity can be accomplished by applying black colour (e.g. based on carbon black) as an opaque layer. Alternatively, for instance an opaque disc, e.g. a black anodized aluminum disc, may be adhered to bottom 4 of the recess or be otherwise mounted to it.

Specifically, the light is focussed only onto a partial area of the photo sensors in the first embodiment. The "beam spot" has the shape of a circular ring whose width is significantly smaller than the width of circular ring segment-shaped photo sensors 18, 19, 20, 21 or, respectively, the circular ring segment-shaped openings in aperture mask 10. Here, by the reflection of the light at side face 6, a redistribution of the light from the light source is caused: light emitted at small angles in the forward direction (the direction corresponding to axis A in FIG. 1 is assumed to be a 0°-direction) travels to the outer part of the circular ring, and light emitted by light source 3 at large angles of radiation travels to the inner part of the circular ring-shaped region.

Although the light incident on the photo sensors is not parallel, an insensitivity to axial shifts (to a change of the distance between light source 3 and photo sensors 18, 19, 20, 21) can nevertheless be achieved with this embodiment. By the fact that the width of the circular ring inside which light falls on the photo sensors is significantly smaller than the width of the circular ring segments in the radial direction, the "beam spot" remains on the photo sensors even in the case of axial shifts. Thus, no change in the light intensity as recorded by the photo sensors is caused by axial shifts. In the same manner, the shaping of the light also provides for an insensitivity to radial shifts of the photo sensors.

By means of beam shaping element 7 it is provided that as large a portion of the light emitted by light source 3 as possible is incident on the photo sensors. Although a certain angular range of the light from light source 3 emitted in the forward direction is not used for the illumination of the photo sensors due to the opaque coating on beam shaping element 7, very good signal-to-noise values were achieved with the position detector according to the invention. One of the reasons is that the solid angle portion of the light at large angles of radiation (if the forward radiation direction is assumed to be 0°) is large. Here, a solid angle is understood to be that portion of a spherical surface encompassing light source 3 through which light rays emitted by light source 3 are passing, wherein it is assumed that the light source is a point source of radiation. If as high a percentage of the light at large angles of radiation as possible is directed to the photo detectors, a high percentage of the total solid angle range into which light source 3 emits is used. This leads to an improved utilization of the light from light source 3 even when taking into account the fact that the radiation density of the light source is typically less at large angles of radiation than at small angles of radiation.

An angle 14 shown in FIG. 3 at the bottom of recess 4 is slightly larger than 90°. The angle may be between 90° and 105°, preferably between 91° and 95°. Here, the inclination of the sidewalls of recess 4 affects the refraction characteristics. The closer the angle is to 90°, the further outwards the rays are refracted. This leads to the result that beam shaping element 7 may be correspondingly shorter designed. Hence, with angles close to 90° a particularly compact setup is achieved. However, the angle should preferably be slightly greater than 90° since this brings about advantages for the fabrication of beam shaping element 7. Since beam shaping element 7 is preferably fabricated by injection molding, an angle greater than 90° facilitates the removal of the injection mold from recess 4.

For the sake of clarity, it is not shown in the Figures how beam shaping element 7 is supported, i.e. fixed in its position between light source 3 and the setup consisting of fastening screw 12, light-blocking element 5, and photo sensors 18, 19, 20, 21. There are, basically, several ways of mounting beam shaping element 7. It is appropriate to fix beam shaping element 7 to a housing not shown in the Figures, encompassing the overall setup respectively illustrated. Since beam shaping element 7 is preferably fabricated by injection molding, it is also appropriate to integrally form the mounting elements with beam shaping element 7 by injection molding. Here, lugs, webs, or snap-in hooks are, for instance, conceivable as mounting elements, providing for a form-fit connection to the housing. Certainly, there may also be provided recesses or loops at the sidewall of beam shaping element 7, into which projections of the housing then engage. In the case where mounting elements are arranged on side face 6, they should preferably be arranged at positions where no reflection of the light incident on the photo sensors takes place.

Due to the rotational symmetry of the overall setup, specifically, a cylindrical housing is possible. In such a case, an inner cylinder encompassing the setup may be formed by injection molding, which is arranged inside the cylindrical housing and is fixed to the cylindrical housing. Here, the connection between the inner cylinder and beam shaping element 7 may be established via connecting webs formed by injection molding between beam shaping element 7 and the inner cylinder, so that, ultimately, beam shaping element 7, the connecting webs, and the inner cylinder are integrally formed by injection molding.

Alternatively to integrally forming beam shaping element 7 and mounting elements, mounting elements may also be adhered to beam shaping element 7, wherein, in case the contact area between mounting elements and beam shaping element 7 is located at a position at which a reflection of the light incident on the photo sensors takes place, a layer is preferably applied which can reflect light towards the inside of beam shaping element 7. In this manner it is achieved that also the contact regions between the mounting elements and beam shaping element 7 can be used as reflecting surfaces.

Second Embodiment

FIG. 4 shows the optical path when a beam shaping element 207 according to a second embodiment is used. The second embodiment differs from the first embodiment merely in the modified beam shaping element 207. All further elements of the second embodiment are identical to those of the first embodiment. Furthermore, all options of modification described in respect of the first embodiment are also applicable to the second embodiment.

As can be seen with regard to FIG. 4, in contrast to the first embodiment, surface 232 of beam shaping element 207 facing photo sensors 19, 20 is not planar, but is rather divided into a recessed central region 232a and an outer region 232b, as in FIG. 1.

As with the first embodiment, it can be seen that light rays emitted by light source 3 do not pass through the bottom of truncated cone-shaped recess 204. Again, the reason is that bottom 204a of recess 204 is coated with an opaque material. As with the first embodiment, an opaque layer could, certainly, be alternatively applied to beam shaping element 207 in central region 232a of exit surface 232.

Light rays emitted by light source 3 are first refracted at the edge (lateral surface 204b) of recess 204 and subsequently directed towards photo sensors 18, 19, 20, 21 by total reflection at side face 206, wherein a refraction takes place once again at surface 232. Side face 206 is again, as in the first embodiment, a freeform surface whose shape has been determined using computer simulations.

In contrast to the first embodiment, in the second embodiment the light from light source 3 is concentrated onto a circular ring whose width is greater than the width of circular segment-shaped photo sensors or, respectively, of circular segment-shaped openings in aperture mask 10. Beam shaping element 207 acts as a collimator in which parallel light exits at exit side 232 towards the photo sensors.

In comparison with using a lens as a collimating element, as in U.S. Pat. No. 7,688,432 B1, the following advantage arises with the Second Embodiment:

The light exiting light source 3 is reshaped by beam shaping element 207 such that it is radiated in the shape of a circular ring towards plane 23 having photo sensors 18, 19, 20, and 21. Specifically, it is provided by the presence of recess 204 and by arranging light source 3 directly behind the side of beam shaping element 207 facing away from the photo sensors that also light rays emitted at a large angle of radiation with respect to the forward radiation direction of light source 3 (the 0°-direction defined further above) are directed towards the photo sensors by reflection. Since the light is reflected towards the photo sensors at side face 206 of beam shaping element 207 shaped correspondingly, a bigger amount of light from light source 3 is directed to the photo sensors than with an aperture having the same diameter. In contrast to an aperture, the light is not directed to an arbitrarily large region outside the region covered by the photo sensors. Although, in contrast to the first embodiment, the circular ring-shaped illumination area generated by beam shaping element 207 according to the second embodiment is broader in a radial direction than the width of circular ring segment-shaped photo sensors 18, 19, 20, 21 or, respectively, of circular ring segment-shaped openings in aperture mask 10, the width of the circular ring does not, however, need to significantly exceed the width of the circular ring segments or, respectively, of circular ring segment-shaped openings. In contrast to an aperture, the light is hereby more strongly concentrated onto the photo sensors.

With the second embodiment, parallel light is incident on the photo sensors, so that insensitivity to axial shifts between light source and photo sensors is given. Since, furthermore, the width of the circular ring-shaped illumination area is greater than the width of the circular ring segments or, respectively, circular ring segment-shaped openings, insensitivity to radial shifts of the photo sensors with respect to light source 3 is also given. The amount by which the width of the circular ring-shaped illumination area exceeds the width of the circular ring segments or, respectively, circular ring segment-shaped openings depends on which axial shifts are being anticipated. The width of the circular ring area is adjustable by shaping side faces 206 and, thus, the reflection characteristics of side faces 206.

Possible Modifications of the Embodiments

The invention is not limited to the explicit configuration of the two embodiments just described. Rather, the following modifications are, inter alia, possible with both embodiments:

While it is particularly possible with the above embodiments that the light is reflected in the beam shaping element at a paraboloid segment-shaped surface, a surface deviating from a paraboloid segment shape may be explicitly selected as a freeform surface in order to obtain a greater freedom in implementing a specific pattern of the light exiting the beam shaping element.

As already described with regard to FIG. 1, exit surface 32 or, respectively, 232, need not be planar. This surface may rather have a curvature, recesses or steps. For example, a recess may be provided which allows to immerse fastening screw 12. Since a very small distance between the beam shaping element and photo sensors 18, 19, 20, 21 including light-blocking element 5 can thereby be achieved, such a measure is advantageous with regard to a compact setup.

In particular, exit surface 32 or, respectively, 232 may also be a freeform surface of an arbitrary shape. Then, its exact shape, which may be determined by computer simulations (e.g. by ASAP), depends on what kind of "beam spot" has to be generated, i.e. which planar shape the light incident on plane 23 having the photo sensors should have.

Also bottom 4*a*, 204*a* of recess 4 or, respectively, 204 and/or its lateral surface 4*b*, 204*b* may be freeform surfaces.

Instead of applying the opaque layer at the border or, respectively, the bottom of recess 4, 204, an opaque layer may be alternatively or additionally applied in the central region of exit surface 32 onto beam shaping element 7, i.e. at a position where exit surface 32 faces fastening screw 12. The opaque layer may be implemented in the same manner as described with respect to the first embodiment.

It should be noted that it is also possible to completely dispense with applying opaque layers to beam shaping element 7. In such a case, in particular, the rays at small angles of radiation, ending in FIGS. 3 and 4 at bottom 4*a* or, respectively, 204*a* of recess 4 or, respectively, 204 in the opaque layer, should not be incident directly on the photo sensors. Further, the head of fastening screw 12 should preferably be blackened in order to prevent disturbing reflections at the screw head. If opaque layers at beam shaping element 7 are dispensed with, it is particularly also possible to shape recess 4, 204 and/or exit surface 32, 232 such that the rays at small angles of radiation, i.e. for example at angles smaller than ±30° or, respectively, smaller than ±25°, are purposefully directed onto the blackened head of fastening screw 12. Provided that the screw head has a recess (e.g. an internal hex), the rays may also be purposefully directed into this recess. With this approach, even a blackening of the screw head may be dispensed with, although a blackening is advantageous also in this case. Ultimately, it is only important that the rays not reflected at side face 6, 206 do not reach the photo sensors.

Further, recess 4 or, respectively, 204 may have sidewalls 4*b* curved inwards and pointed at the bottom. For instance, the region where sidewalls 4*b* meet may have similarity with the region around the lowest point of a common or curtate cycloid. With such a shape, a better utilization of the light rays from light source 3 emitted in a forward direction (angular range of radiation close to 0°) is achievable. In an ideal case, even all measures for blocking the rays exiting light source 3 at small angles of radiation (e.g. opaque layers) may be completely dispensed with.

Although the light source is arranged outside recess 4 or, respectively, 204 in FIGS. 3 and 4, light source 3 may also be immersed in the recess. If the light source does not protrude into recess 4 or, respectively, 204, the distance between light source and beam shaping element should be so small that possibly all rays from the light source (including those at large angles of radiation) strike the beam shaping element.

Although the beam shaping element has a rotationally symmetric shape in FIGS. 3 and 4, it is also possible that surfaces 30 and 230 facing the light source and/or surfaces 32 and 232 facing the photo sensors are polygons. In particular, beam shaping element 7, 207 and/or recess 4, 204 may have a truncated pyramid-like shape.

The freeform surface in the beam shaping element, at which the light is reflected, need not mandatorily be circular cylinder-shaped.

In the present invention, the light-blocking element may be, in particular, formed with a diameter smaller than 10 mm, preferably between 2 and 9 mm, even though the invention is not limited thereto. Thereby, a very compact position detector having a small diameter in a direction perpendicular to the axis of rotation A is obtained.

On the contrary, position detectors in which the angular position is encoded are reaching their limits when requirements for the accuracy of the angular measurement are increased. The reason is that with the encoding position detectors, which typically use an encoder disc, the angular resolution is only achievable by increasing the disc diameter since the stripe code on the disc cannot be formed with arbitrarily small details.

Also regarding the moment of inertia with respect to the axis of rotation, position detectors having a particularly small moment of inertia of the element rotating around the axis of rotation (here, the light-blocking element) can be implemented with the present invention. In particular, the moment of inertia of the element rotating around the axis of rotation (here, the light-blocking element) may be below 0.010 g·cm$^2$, preferably below 0.008 g·cm$^2$, and more preferably below 0.006 g·cm$^2$. With the present invention, it is even possible to implement position detectors having the moment of inertia of the element rotating around the axis of rotation (here, the light-blocking element) between 0.003 and 0.004 g·cm².

As already mentioned, the (angular) position detector according to the invention can be used in a scanning device mentioned in the introductory part of the description, by which scanning device a light beam, in particular a laser beam, is directed to different positions in a surface in order to detect properties at these positions or in order to carry out a processing step at these positions using the laser beam. The angular position of the rotatable mirror used for deflecting the light beam, which is fixed at the axis of rotation A connected to light-blocking element 5, can then be determined and be used for controlling a scan process. In particular, the position detector according to the invention can be used in a scanning device as described in EP 1 295 090 B1. Details of the implementation in a scanning device (an example for mounting an angular position detector in a scanning device) are already described in EP 1 295 090 B1 and are, therefore, not repeated here.

What is claimed:

1. A position detector for determining a rotation angle of an element that is rotatable around an axis of rotation, the position detector comprising:
   a light source;
   a detector element for detecting light radiation emitted by the light source, wherein the detector element is arranged around the axis of rotation and comprises at least two photo sensors arranged in a plane;
   a beam reshaping element spatially arranged between the light source and the detector element wherein, by the beam reshaping element, light from the light source is directed towards the detector element; and
   a light-blocking element positioned between the beam reshaping element and the detector element such that the light-blocking element can rotate around the axis of rotation together with the rotatable element whereby, depending on the rotation angle, the incidence of light on different partial regions of the detector element is prevented, wherein:
   the beam reshaping element comprises at least one freeform surface at which the light from the light source is reflected on its way to the detector element; and
   the beam reshaping element is configured such that the light directed towards the detector element is concentrated onto the detector element into an area shaped as a circular ring.

2. The position detector according to claim 1, wherein the beam reshaping element is configured such that the light exiting the beam reshaping element is shaped as a circular ring.

3. The position detector according to claim 2, wherein an area of each photo sensor onto which the light from the light source can be incident is shaped as a circular ring segment.

4. The position detector according to claim 1, wherein the light undergoes total reflection at the at least one freeform surface.

5. The position detector according to claim 1, wherein an area of each photo sensor onto which the light from the light source can be incident is shaped as a circular ring segment.

6. A scanning device having a position detector according to claim 5.

7. The position detector according to claim 5, wherein the beam reshaping element is configured such that the light exiting the beam reshaping element is shaped as a circular ring and the width of the circular ring-shaped light distribution in a radial direction is greater than the width of the circular ring segment in a radial direction.

8. The position detector according to claim 5, wherein the light-blocking element has a diameter smaller than 10 mm in a direction perpendicular to the axis of rotation.

9. The position detector according to claim 5, wherein the light-blocking element has a moment of inertia that is below 0.010 g·cm² with respect to the axis of rotation.

10. The position detector according to claim 5, wherein the beam reshaping element is configured such that the light exiting the beam reshaping element is shaped as a circular ring and the width of the circular ring-shaped light distribution in a radial direction is smaller than the width of the circular ring segment in a radial direction.

11. The position detector according to claim 10, wherein the light-blocking element has a diameter smaller than 10 mm in a direction perpendicular to the axis of rotation.

12. The position detector according to claim 10, wherein the light-blocking element has a moment of inertia that is below 0.010 g·cm² with respect to the axis of rotation.

13. A scanning device having a position detector according to claim 10.

14. The position detector according to claim 1, wherein the beam reshaping element has a truncated cone-like or truncated pyramid-like shape, and wherein the top surface faces the light source and the symmetry axis coincides with the axis of rotation.

15. The position detector according to claim 14, wherein the side surface of the truncated pyramid or truncated cone is convex with respect to its symmetry axis and the side surface is the surface at which the light is reflected.

16. The position detector according to claim 15, wherein the beam reshaping element comprises a recess in its surface facing the light source.

17. The position detector according to claim 16, wherein the recess is shaped as a truncated cone or a truncated pyramid and the beam reshaping element is provided with an opaque coating at the top surface of the truncated cone or truncated pyramid.

18. The position detector according to claim 1, wherein the light-blocking element has a diameter smaller than 10 mm in a direction perpendicular to the axis of rotation.

19. A position detector according to claim 1, wherein the light-blocking element has a moment of inertia that is below 0.010 g·cm² with respect to the axis of rotation.

20. A scanning device having a position detector according to claim 1.

* * * * *

UNITED STATES PATENT AND TRADEMARK OFFICE
CERTIFICATE OF CORRECTION

PATENT NO. : 9,903,743 B2
APPLICATION NO. : 14/787366
DATED : February 27, 2018
INVENTOR(S) : Norbert Petschik, Hans-Joachim Münzer and Norbert Kirr Page 1 of 1

It is certified that error appears in the above-identified patent and that said Letters Patent is hereby corrected as shown below:

On the Title Page

Item (72) should be corrected to read:
Inventors: Norbert Petschik, Puchheim (DE);
Hans-Joachim Münzer, Puchheim (DE);
Norbert Kirr, Puchheim (DE)

Signed and Sealed this
Eighth Day of May, 2018

Andrei Iancu
*Director of the United States Patent and Trademark Office*